United States Patent [19]

Maguire

[11] 4,393,976
[45] Jul. 19, 1983

[54] REUSABLE CHILDPROOF CLOSURE

[76] Inventor: Daniel J. Maguire, 323 W. Waverly Rd., Glenside, Pa. 19038

[21] Appl. No.: 356,962

[22] Filed: Mar. 11, 1982

[51] Int. Cl.³ .............................................. B65D 55/02
[52] U.S. Cl. .................................... 215/211; 215/215; 215/224; 215/320; 215/355; 220/307
[58] Field of Search ............... 215/211, 215, 224, 320, 215/355; 220/307, 284

[56] References Cited

U.S. PATENT DOCUMENTS

| 4,185,747 | 1/1980 | Goncalves | 215/355 |
| 4,226,334 | 10/1980 | Weiler | 215/355 |
| 4,231,486 | 11/1980 | Bock | 215/355 |
| 4,278,178 | 7/1981 | Geiser | 215/215 |
| 4,355,729 | 10/1982 | Maguire | 215/211 |

Primary Examiner—George T. Hall
Attorney, Agent, or Firm—Karl L. Spivak

[57] ABSTRACT

A reusable childproof container closure is disclosed for closing the nozzle of a plastic container wherein the container terminates upwardly in a nozzle including a peripheral groove. A plastic closure includes an inserting member having a cooperating, peripheral lip formed therein for removable engagement in the peripheral groove. The closure also includes a peripheral skirt formed with depending sidewalls which overfit the nozzle and which provide a surface to be engaged by a tool such as a screwdriver for closure removal purposes.

12 Claims, 3 Drawing Figures

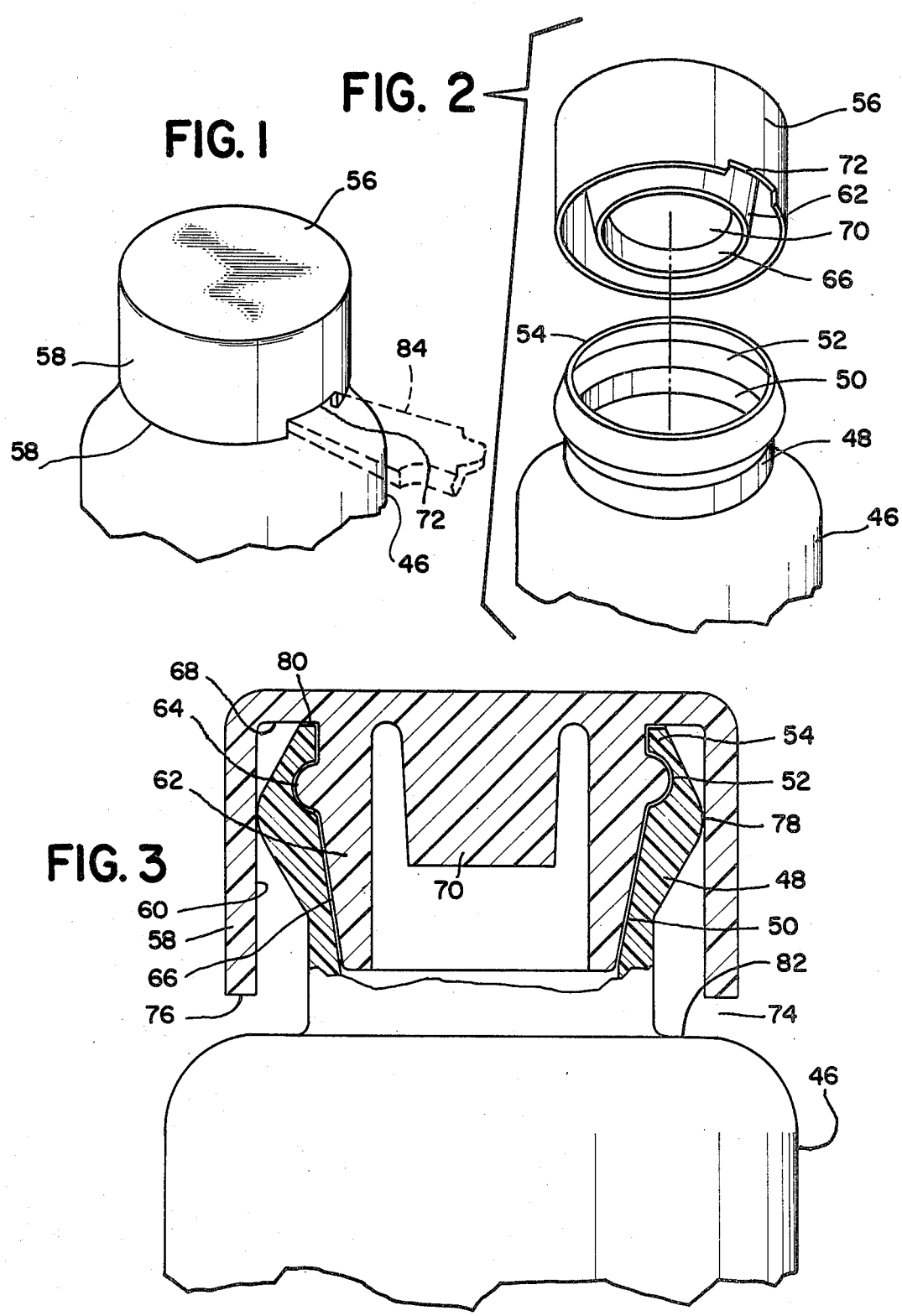

REUSABLE CHILDPROOF CLOSURE

BACKGROUND OF THE INVENTION

The present invention relates generally to the field of childproof closures, and more particularly, is directed to reusable childproof closure which can be removed from an associated container only by employing an additional tool, such as a screwdriver.

The closure industry has been directed by governmental agencies and others to provide for adequate safety of children by designing and manufacturing closures of a type that will discourage access to container contents which may prove harmful to children. Recent government regulations promulgated for the safety of children and other consumers have increased industry efforts to design childproof closures which are simple in operation, inexpensive in production and which can be easily affixed during assembly line processing of filled containers in a variety of industries. Such industries include, among others, the pharmaceutical, petroleum, cosmetic, household, industrial cleaner, automotive and paint industries.

Numerous container closures with child resistant features have been developed by prior workers in the art and which have been designed particularly to meet or surpass the applicable Federal Regulations. Considerable time, effort and costs have been expended in the packaging and closure industries and great strides have been made with numerous acceptable designs being developed and manufactured. These prior art closures have been tested and approved in accordance with established criteria and literally millions of such closures have been manufactured and used to date. Most of the existing, approved, child resistant closures suffer from a common drawback, that is, they are all relatively more costly in manufacture and use than the already existing closures which are not particularly designed as child resistant. In the case of certain medicines and industrial products wherein repeated use is contemplated, the need exists for a simple, inexpensive, child resistant closure to thereby not increase packaging costs.

SUMMARY OF THE INVENTION

The present invention relates generally to childproof container closures, and in particular, relates to a reusable, simply designed, inexpensive childproof closure.

The closure of the present invention comprises generally a cap which is designed for snap on-snap off use with a container such as a plastic bottle including a nozzle. In the preferred embodiment, the closure is formed of a resilient plastic, for example molded or otherwise formed polyethylene plastic, polypropylene plastic or other plastics satisfactory for the use. The bottle may be of blow molded plastic or other material similarly employed for container purposes. In a preferred embodiment, the container nozzle is molded, formed or otherwise treated to provide an interior, recessed, peripheral groove in the interior wall of the container nozzle. The closure comprises generally a hollow, cylindrical, wall that is molded or otherwise formed with a complementary peripheral lip or flange of size to fit within and to seal within the nozzle peripheral groove. When the closure is forced downwardly into the nozzle, the peripheral lip will be forced into the peripheral groove in a tight, sealed, engagement. The flange and groove configurations make removal of the closure difficult or even impossible without the use of a separate prying tool, such as a screwdriver, which may be suitable leveraged to separate the closure from the nozzle when it is desired to expose the contents of the container. The natural resiliency of the plastic material of the cap assures a tight seal once the closure cylindrical wall is pressed into the nozzle sufficiently to seat the peripheral lip within the nozzle groove. The closure cap further comprises an integral, outer, hollow, cylindrical skirt or sidewall which exteriorly overfits the container nozzle. In a preferred embodiment, the cylindrical skirt can be formed of suitable diameter to circumferentially engage the outer surface of the nozzle to form a second seal therewith. If desired, a third seal can be formed between the top of the nozzle and the underside of the cap extension intermediate the cylindrical interior wall and the closure exterior sidewall.

The closure peripheral sidewall extends downwardly substantially the entire length of the nozzle and terminates a short distance above the bottle shoulder to define a clearance space therebetween. By inserting a prying tool, such as a screwdriver, into the clearance space and then twisting the screwdriver to bear downwardly against the shoulder of the container and upwardly against the bottom surface of the sidewall, sufficient forces can be generated to pry loose the closure from the nozzle by forcing the peripheral lip upwardly and out of the peripheral nozzle groove.

It is therefore an object of the present invention to provide an improved reusable childproof closure of the type set forth.

It is another object of the present invention to provide a novel reusable childproof closure which includes a nozzle having an interior peripheral groove and a closure having a peripherally outwardly extending lip which is removably seatable within the groove.

It is another object of the present invention to provide novel reusable childproof closure wherein the container nozzle and the container closure contact and seal to form three separate and distinct seals.

It is another object of the present invention to provide a novel reusable childproof closure that requires the use of an exterior tool to separate the closure from the container nozzle.

It is another object of the present invention to provide a novel reusable childproof closure which comprises a container nozzle formed with an interior, peripheral groove, a plastic closure insertable into the nozzle and comprising a peripheral lip designed to seat within and seal within the peripheral groove, the closure further comprising an exterior, depending skirt which peripherally overfits the container nozzle and provides a means for removing the closure from the container.

It is another object of the present invention to provide a novel reusable childproof closure that is inexpensive in manufacturer, trouble free in operation and child resistant when in use.

Other objects and a fuller understanding of the invention will be had by referring to the following description and claims drawn to a preferred embodiment thereof, taken in conjunction with the accompanying drawings, wherein like reference characters refer to similar parts throughout the several views and in which:

BRIEF DESCRIPTION OF THE DRAWINGS

FIG. 1 is an isometric view showing the closure in place in the nozzle of a container.

FIG. 2 is a partial, exploded, isometric view of the closure and container nozzle of FIG. 1.

FIG. 3 is an enlarged, partial, elevational view showing the closure applied to the nozzle, and partly broken away to expose interior construction details.

DESCRIPTION OF THE PREFERRED EMBODIMENTS OF THE INVENTION

Although specific terms are used in the following description for the sake of clarity, these terms are intended to refer only to the particular structure of the invention selected for illustration in the drawings, and are not intended to define or limit the scope of the invention.

Referring now to the drawings, there is illustrated in FIGS. 1, 2 and 3 a reusable childproof closure which comprises generally a container bottle 46 and a closure or cap 56 associated therewith. The bottle may be formed of rigid or resilient material of types generally employed for liquid and medicinal storage purposes, such as blow molded plastic, glass or other materials. The cap or closure 56 preferably is formed of resilient material, such as molded polyethylene or polypropylene plastic.

As best seen in FIGS. 2 and 3, the container 46 is upwardly formed to provide a nozzle 48 of size suitable to promote filling of the container at the factory and the removal of the container contents at the place of use. The nozzle defines an opening in fluid communication with the container interior and terminates upwardly in a peripheral top. In a preferred embodiment, the nozzle 48 is formed to a diameter smaller than the diameter of a container 46 and is defined therefrom by an inwardly extending shoulder 82.

The nozzle 48 may be formed with conical shaped interior sidewalls 50 as best seen in FIG. 3 or with cylindrically formed sidewalls (not illustrated). The conical shape 50 as shown is preferred to facilitate assembly of the parts by pressing the cap 56 downwardly onto the nozzle 48 for closure purposes. An outwardly extending, peripheral groove 52 is formed in the nozzle of sidewall 50 to receive therein the peripheral lip 64 of the cap 56 as hereinafter more fully set forth. As most clearly seen in FIG. 3, the nozzle 48 extends radially outwardly near the groove 52 to form an outer peripheral surface which can cooperate with the cap 56 to form a second seal 78 as hereinafter more fully set forth. The nozzle 48 terminates upwardly in a top surface 54 which can cooperate with the cap 56 to form a third seal 80 therewith as hereinafter more fully set forth.

The cap 56 is preferably formed of a resilient, easily molded material, such as polyethylene plastic or polypropylene plastic and is formed to include a depending, hollow, cylindrical wall 62 which defines an interior closure construction or member. The hollow wall 62 has its outer face 66 shaped to conform to the configuration of the nozzle interior sidewall 50, which, in the embodiment illustrated, is truncated conical in configuration. The conical configuration has been chosen to facilitate the application of the cap 56 to the nozzle 48 and its removal therefrom. It will appreciated, however, that the invention is not limited to such conical configuration and the cooperating cap exterior face 66 and the cooperating nozzle interior face 50 could be cylindrically formed and still come within the meaning and the intent of this invention. The cap cylindrical wall 62 comprises a peripheral lip or flange 64 of dimensions, configuration and position to seat within the nozzle groove 52 for sealing purposes and for child resistant purposes when the cap 56 is fully applied and seated on the nozzle 48. Preferably, the cap peripheral lip 64 is formed to a dimension that is slightly larger (on the order of 0.001-0.004 inches) than the dimensions of the nozzle groove 52 whereby the natural resiliency of the cap material allows the lip 64 to seat tightly within the groove 52 in a tight, sealing engagement. The resiliency of the cap material allows the cap to be inserted into the nozzle 48 and also allows the cap to be removed from the nozzle 48 upon the application of exterior forces.

As best seen in FIG. 3, the cap extends radially outwardly from the top of the cylindrical wall 62 in a peripheral extension 68 of width sufficient to encompass the outer extent of the exterior configuration of the nozzle 48. A cylindrical sidewall downwardly depends from the outer extent of the cap extension 68 and terminates downwardly in a bottom surface 76. The cylindrical cap sidewall 58 depends from the cap top substantially the full height of the nozzle 48 and terminates above the container shoulder 82 to define a small clearance space 74 therebetween. Preferably, a tool receiving notch 72 is formed near the bottom of the cylindrical cap sidewall 58 to facilitate cap removal as hereinafter more fully set forth. The cap extends radially inwardly from the cylindrical sealing wall 62 to provide a sturdy body 70 which can be molded or otherwise formed simultaneously with the remaining portions of the cap 56.

The dimensions of the cap 56 and the nozzle 48 can be carefully designed and fabricated to provide a plurality of three separate and distinct seals. A first seal is formed by the engagement of the cap peripheral lip 64 within the nozzle peripheral groove 52. A second seal 78 can be formed between the outermost peripheral surface of the nozzle 48 and the innermost surface 60 of the cap sidewall 58. A third seal 80 can be provided by adjusting the height of the extension 68 above the peripheral lip 64 to an appropriate distance whereby the top 54 of the nozzle 48 bears against the underside of the extension 68 when the lip 64 is fully seated within the nozzle groove 52. Thus, it is seen that by carefully dimensioning and configuring the nozzle and the cap, a first seal can be provided between the cap peripheral lip 64 and the nozzle peripheral groove 52, a second seal 78 can be provided between the outermost extension of the body of the nozzle 48 and the interior surface 60 of the cap sidewall 58 and a third seal 80 can be provided between the top 54 of the nozzle 48 and the underside of the cap extension 68. While the construction illustrated can provide up to three separate and distinct seals, it will be appreciated that only a single childproof feature is incorporated, namely the interaction between the cap peripheral lip 64 and the nozzle peripheral groove 52. It is the interlocking feature between the cap and the groove that functions to prevent easy disassembly of the parts.

In order to utilize the child resistant closure of the present invention, the container 46 is first filled with the desired materials to be stored therewithin and then the cap 56 is concentrically aligned above the nozzle 48. Downwardly directed forces are applied upon the top surface of the cap to force the hollow cylindrical wall 62 of the cap 56 downwardly within the opening defined by the nozzle 48 by sliding the conically shaped face 66 of the nozzle downwardly along the similarly conically shaped face 50 of the nozzle. Continued downwardly pressures upon the cap 56 will force the peripheral lip 64 past the top 54 of the nozzle 48 by flexing inwardly the hollow cylindrical walls 62 sufficiently until the peripheral cap lip 64 seats within and seals against the peripheral groove 52 of the nozzle 48. As above set forth, when the nozzle and the cap 56 are in the closed position as illustrated in FIG. 3, a plurality of three separate seals can thereby be provided.

In order to remove the cap 56 from its association with the nozzle 48, it will be appreciated that the retaining forces between the slightly oversized cap peripheral lip 64 and the slightly smaller nozzle peripheral groove 52 will normally be sufficient to prevent ready disassociation of the parts and therefore, will discourage children from separating the cap 56 from association with the nozzle 48. By virtue of this interaction, the device should be considered as a child resistant closure which cannot normally be opened by children in accordance with existing regulations. When it is desired to remove the cap 56 from association from the nozzle 48 to thereby gain access to the contents stored within the container 46, a suitable prying tool, such as a screwdriver 84 should be applied at the opening 74 between the bottom 76 of the cap sidewall 58 and the shoulder 82 of the bottle 46. Preferably, the screwdriver 84 is applied at the notch 72 which is provided for this purpose. By twisting the screwdriver relative to the container, one edge of the screwdriver blade can be made to bear against the container shoulder 82 and the other edge of the screwdriver blade can be made to bear upwardly against the cap sidewall 52 at the top of the notch 72. By applying sufficient twisting action to the screwdriver 84, sufficient forces will be generated to force upwardly the cap 56 relative to the nozzle 48 to thereby force the cap peripheral lip 84 upwardly and out of the nozzle peripheral groove 52.

Although the invention has been described with a certain degree of particularity, it is understood that the present disclosure has been made only by way of example and that numerous changes in the details of construction and the combination and arrangement of parts may be resorted to without departing from the scope of the invention.

What is claimed is:

1. In a reusable childproof closure suitable to close the nozzle of a container of the type wherein the nozzle is defined from the container by a shoulder, the improvement which comprises the nozzle comprising a circular wall having an inside surface and an outside surface, a peripheral groove extending radially outwardly from the inside surface of the nozzle; and a cap in overfitting relationship to the nozzle, the cap comprising a top and a hollow, generally cylindrical, closure wall depending from the top, said closure having an inside surface and an outside surface, the outside surface being of dimension and configuration to slide within and cooperate with the inside surface of the nozzle circular wall, a peripheral lip extending radially outwardly from the outward surface of the cap closure wall, the configuration of the nozzle peripheral groove and the configuration of the cap peripheral lip being cooperating and complementing to form a lock therebetween when the cap is applied to the nozzle, the cap further comprising an outer, generally cylindrical skirt, the said skirt being connected to the said cap closure wall by a radial extension and being configured overfit substantially the entire nozzle, whereby the cap can be removed from the nozzle by applying upwardly directed forces at the bottom of the said skirt and sufficient magnitude to force the cap lip out of the nozzle groove.

2. The childproof closure of claim 1 wherein the outer diameter of the cap peripheral lip is greater than the outer diameter of the nozzle peripheral groove.

3. The childproof closure of claim 1 wherein the skirt terminates downwardly near the said shoulder of the container.

4. The childproof closure of claim 3 wherein the skirt bottom is provided with a notch, the notch being of size adapted to receive therein a tool to apply upwardly directed forces.

5. The childproof closure of claim 3 wherein the bottom terminus of the skirt defines a small clearance space above the container shoulder.

6. The childproof closure of claim 1 wherein the interaction of the cap peripheral lip within the nozzle peripheral groove forms a first seal to prevent escape of contents from the container when the cap is locked onto the nozzle.

7. The childproof closure of claim 1 wherein the skirt comprises an interior surface overfitting the nozzle, the dimensions of the skirt being defined to peripherally contact the said nozzle outer surface with the said skirt interior surface to form a second seal therebetween.

8. The childproof closure of claim 1, wherein the nozzle terminates upwardly in a top and wherein the distance between the nozzle peripheral groove and the nozzle top is substantially equal to the distance between the cap peripheral lip and the underside of the cap radial extension whereby the nozzle cap contacts the radial extension when the cap lip is seated within the nozzle groove to form a third seal therebetween.

9. The childproof closure of claim 7 wherein the nozzle terminates upwardly in a top and wherein the distance between the nozzle peripheral groove and the nozzle top is substantially equal to the distance between the cap peripheral lip and the underside of the cap radial extension whereby the nozzle cap contacts the radial extension when the cap lip is seated within the nozzle groove to form a third seal therebetween.

10. The childproof closure of claim 1 wherein at least a part of the inside surface of the nozzle circular wall is truncated conical in configuration.

11. The childproof closure of claim 1 wherein at least part of the outside surface of the cap closure wall is truncated conical in configuration.

12. The childproof closure of claim 10 wherein at least part of the outside surface of the cap closure wall is truncated conical in configuration.

* * * * *